United States Patent [19]
Eppich et al.

[11] Patent Number: 5,980,235
[45] Date of Patent: Nov. 9, 1999

[54] MEANS FOR DRIVING A DISPLACEABLY MOUNTED COMPONENT OF AN INJECTION MOULDING MACHINE

[75] Inventors: Stefan Eppich, Arbing; Otto Urbanek, Linz, both of Austria

[73] Assignee: Engel Maschinenbau Gesellschaft m.b.H., Schewertberg, Austria

[21] Appl. No.: 08/952,130

[22] PCT Filed: Mar. 14, 1997

[86] PCT No.: PCT/AT97/00056

§ 371 Date: Nov. 5, 1997

§ 102(e) Date: Nov. 5, 1997

[87] PCT Pub. No.: WO97/34757

PCT Pub. Date: Sep. 25, 1997

[30] Foreign Application Priority Data

Mar. 19, 1996 [AT] Austria ......................................... 506/96

[51] Int. Cl.⁶ .................................................. B29C 45/40
[52] U.S. Cl. ............................ 425/542; 264/334; 425/556
[58] Field of Search ..................................... 425/542, 556; 264/334

[56] References Cited

FOREIGN PATENT DOCUMENTS

| 0166788 | 1/1986 | European Pat. Off. . |
|---|---|---|
| 1091744 | 11/1956 | Germany . |
| 59-231823 | 12/1984 | Japan . |
| 61-068219 | 4/1986 | Japan . |
| 2227230 | 9/1990 | Japan . |
| 3231823 | 10/1991 | Japan . |

*Primary Examiner*—Tim Heitbrink
*Attorney, Agent, or Firm*—Notaro & Michalos P.C.

[57] ABSTRACT

An apparatus for driving a displaceably mounted component of an injection molding machine has at least one rotatably mounted crank which is driven by a motor. The crank drives the displaceably mounted component by way of a bar pivotably connected to the crank, the bar engaging a tiltably mounted intermediate lever which, in turn, is connected to the displaceably mounted component. The intermediate lever is mounted tiltably by way of an additional bar. The additional bar is pivotably mounted to be fixed with respect to the frame of the injection molding machine and is pivotably connected to the intermediate lever.

7 Claims, 6 Drawing Sheets

MEANS FOR DRIVING A DISPLACEABLY MOUNTED COMPONENT OF AN INJECTION MOULDING MACHINE

FIELD AND BACKGROUND OF THE INVENTION

An apparatus for driving a displaceably mounted component of an injection molding machine having at least one rotatably mounted crank which is driven by a motor and which drives the displaceably mounted component by way of a bar pivotably connected to the crank. In injection molding machines, crank drives having a rotatably mounted crank and a bar pivotably connected thereto are already known for converting rotary movements, in particular from the drive of an electric motor, into a linear movement.

SUMMARY OF THE INVENTION

In order to improve the transmission of force to the displaceably mounted component and to afford the possibility of increasing the force applied to the displaceably mounted component, the invention provides that the bar engages a tiltably mounted intermediate lever which in turn is connected to the displaceably mounted component.

In accordance with the invention therefore the bar which is driven by the crank does not directly engage the displaceably mounted component, but an intermediate lever which then in turn engages the displaceably mounted component. That makes it possible to improve the geometry involved in the transmission of force and, if this is desirable, also to achieve a lever step-up effect which increases the force on the displaceably mounted component.

It is particularly desirable if the intermediate lever is in the form of a two-armed lever which at the center is pivotably connected to the displaceably mounted component which is pivotably connected on one side of the center to the bar driven by the crank and which is tiltably mounted on the other side of the center.

Such an arrangement, in spite of the fact that there is only a single crank, makes it possible to achieve a structure which is substantially symmetrical in regard to the transmission of force.

In the case of injection molding machines, in particular with a closing force range of between 300 and 3000 kN, there is increasingly a demand for individual electrical drives. Advances in the area of three-phase current servo technology afford an alternative to fully hydraulic machines in so-called hybrid machines in which one or more electrical individual drives are combined with a relatively small hydraulic central drive. In that situation electrical individual drives are distinguished by a low level of power consumption, precise controllability and regulatability and a high level of dynamics involved in the starting and stopping movements in the injection molding procedure.

In order to achieve the energy density which is known from hydraulics however electrical individual drives have to be of very large dimensions. In that case there is the problem that no apparatus which is comparable to storage hydraulics is known in connection with electrical drives, for producing high power peaks as occur at different locations in the injection molding procedure.

Therefore a further object of the present invention is to provide an apparatus by which the power of the electric motor of an electrical individual drive can be kept as constant as possible in the region of the power average of an injection molding cycle during the cycle.

In accordance with an aspect of the invention that is achieved in that there is provided a spring which assistingly acts on the movable component in that direction of movement which requires a higher level of power on the part of the electric motor.

In the case of the linear movements which occur in injection molding, there is typically a large difference in the motor power required for the movement, depending on the direction of movement involved. In addition, in part only short power peaks also occur in connection with that direction of movement which overall has the higher level of power requirement. Those power peaks mostly occur at the beginning of the movement, that is to say during the acceleration phase, as in many cases large masses have to be moved or accelerated. If the motor which is producing the linear movement operates against a spring during the portions of the cycle involving a low level of loading, then the energy which is stored in the compressed spring can be supplied as assistance at the time involving the maximum power need.

The invention can provide for smoothing out power peaks and the ongoing power requirement can on the whole be adapted to the average power value during a cycle.

If the movements involved on the injection side of the injection molding machine are considered, the following procedures are repeated there: 1. metering, 2. injection, 3. compression.

During the metering time the plasticizing screw which is driven in rotation in the plasticizing cylinder continuously moves rearwardly, in which case the motor provided for the axial movement of the plasticizing screw takes only minimum power or is even driven in a generator mode. In contrast the subsequent injection step gives rise to an extremely high rate of power input. In order to compensate for that difference, in accordance with an embodiment it is provided that arranged between the plasticizing cylinder which bears against the stationary mold mounting plate of the injection molding machine and the plasticizing screw which is longitudinally displaceable in the plasticizing cylinder is at least one spring which urges the plasticizing screw in the direction of the stationary mold mounting plate.

For an additional reduction in the size of the electric motor provided for axially driving a longitudinally displaceable, reciprocable component, it can further be provided that the electric motor acts on the plasticizing screw by way of a bell crank mechanism. The electric motor can be adapted in the optimum fashion to the power requirement which changes in relation to time, by way of the constantly changing transmission ratio of the bell crank mechanism.

A structurally simple arrangement is afforded if the spring which acts on the longitudinally displaceable, reciprocable component is in the form of a gas compression spring.

In certain procedures in the cycle, it may be desirable from the energy point of view if the spring which acts on the longitudinally displaceable, reciprocable component is also prestressed in the rest condition.

BRIEF DESCRIPTION OF THE DRAWINGS

Further features and details of the invention will be described more precisely hereinafter with reference to the drawings in which.

DETAILED DESCRIPTION OF THE DRAWINGS

An essential part of the injection arrangement of an injection molding machine is the plasticizing cylinder 1. The plasticizing screw 2 is mounted both rotatably and also axially displaceably in the plasticizing cylinder 1. In the metering operation, that is to say in the operation of preparing and working injectable plastic material the plasticizing screw 2 is driven in rotation by the motor 4. During that metering procedure the plasticizing screw 2 continually moves rearwardly in the plasticizing cylinder 1 while injectable material accumulates in the increasing space in front of the tip of the plasticizing screw 2. During that phase the motor 5 which is responsible for the reciprocating axial movement of the plasticizing screw 2 in the plasticizing cylinder 1 is subjected to only a very slight load. It can even happen that the motor 5 is driven in a generator mode and in so doing applies a braking force to the plasticizing screw in the direction of the tip thereof.

Figure 1:
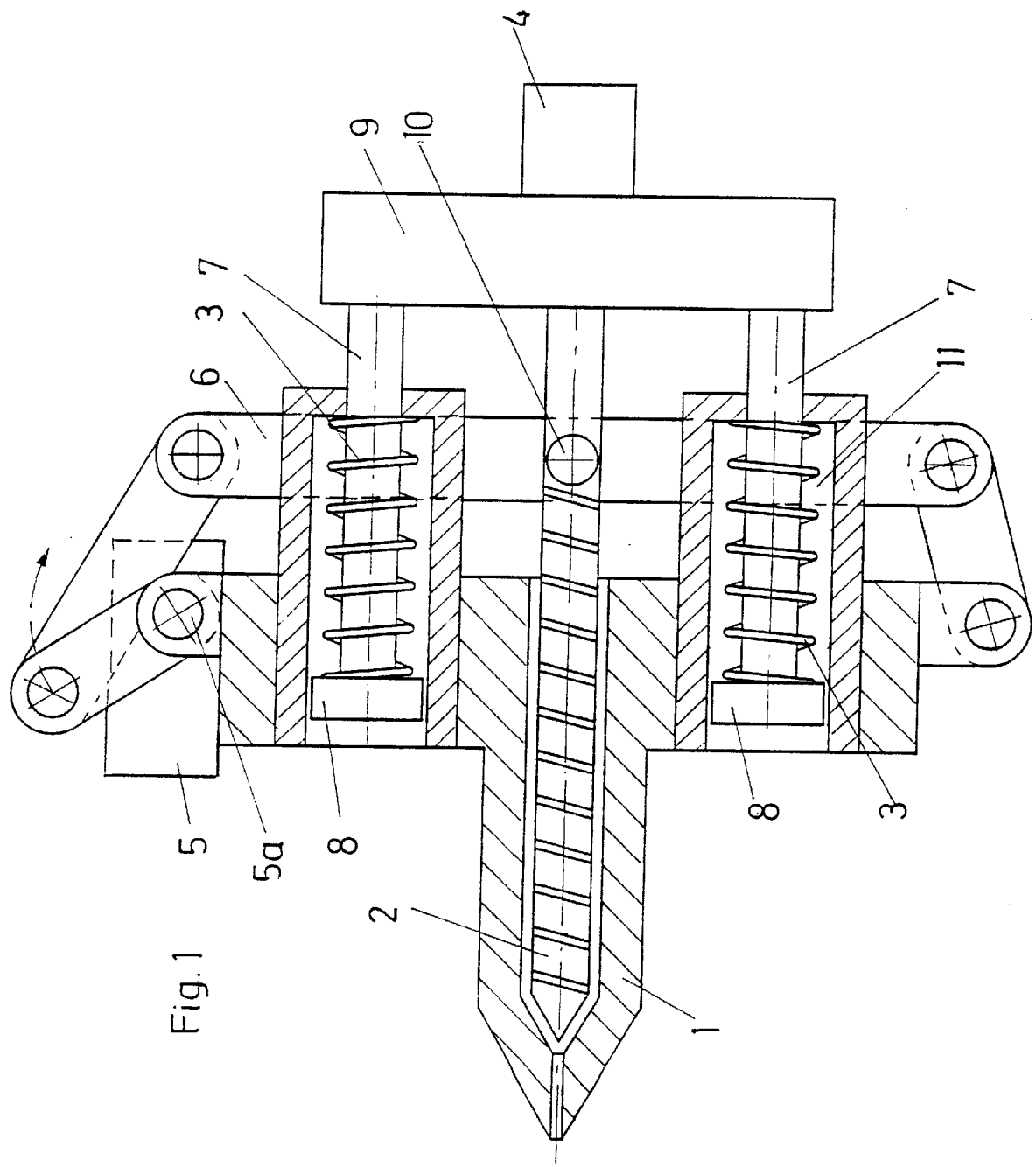
FIG. 1 is a diagrammatic view of the injection arrangement of an injection molding machine according to the invention.

As can be seen from FIG. 1 the plasticizing screw 2 is connected by way of a transverse bearer 9 to symmetrically arranged rods 7. The two rods 7 each have a respective abutment 8 at their free end. The rods 7 form the core for the springs 3 which are supported at one end against the abutments 8 and at the other end against the bottom of the respective cylindrical recess 11. The illustrated arrangement makes it possible for the motor 5 which produces the axial displacement of the plasticizing screw 2 to stress the springs 3 and thus act on an energy storage means. The bell crank mechanism 6 which is driven at the point 5a and which is pivotably connected to the plasticizing screw at the pivot 10 permits the transmission of force with a respectively optimum force relationship.

In the injection procedure which follows the metering operation the injectable plastic material which is prepared in front of the plasticizing screw 2 must be injected under high pressure into the mold (not shown in FIG. 1). For that purpose the plasticizing screw 2 has to be rapidly accelerated and moved at high speed in the direction of the tip of the plasticizing cylinder 1. During that procedure the springs 3 are relieved and reduce the rate of power input of the motor 5 which produces the axial movement of the screw 2.

For illustrative purposes set out below are two examples for the distribution in respect of time of the steps which take place in the injection molding procedure:

Cycle time: 21.10 s
Closure time: 2.28 s
Injection time: 2.48 s
Compression time: 2.00 s
Residual cooling time: 12.00 s Metering time: 9.70 s
Opening time: 1.32 s
Mold removal time: 0.52 s.
Cycle time: 3.90 s
Closure time: 0.98 s
Injection time: 0.22 s
Compression time: 0.20 s
Residual cooling time: 1.80 s Metering time: 0.60 s
Opening time: 0.48 s
Mold removal time: 0.16 s.

As the data show the metering time generally exceeds the injection time even by a multiple. In that way the storage means formed from the springs 3 can be loaded over a comparatively long period of time, with a low level of power input. The high level of power which is necessary for the subsequent injection procedure and which is crucial in regard to the dimensioning of the motor 5 can be greatly reduced by virtue of the energy which is stored in the springs 3 in a form such that it can be liberated in a short period of time.

Figure 2:
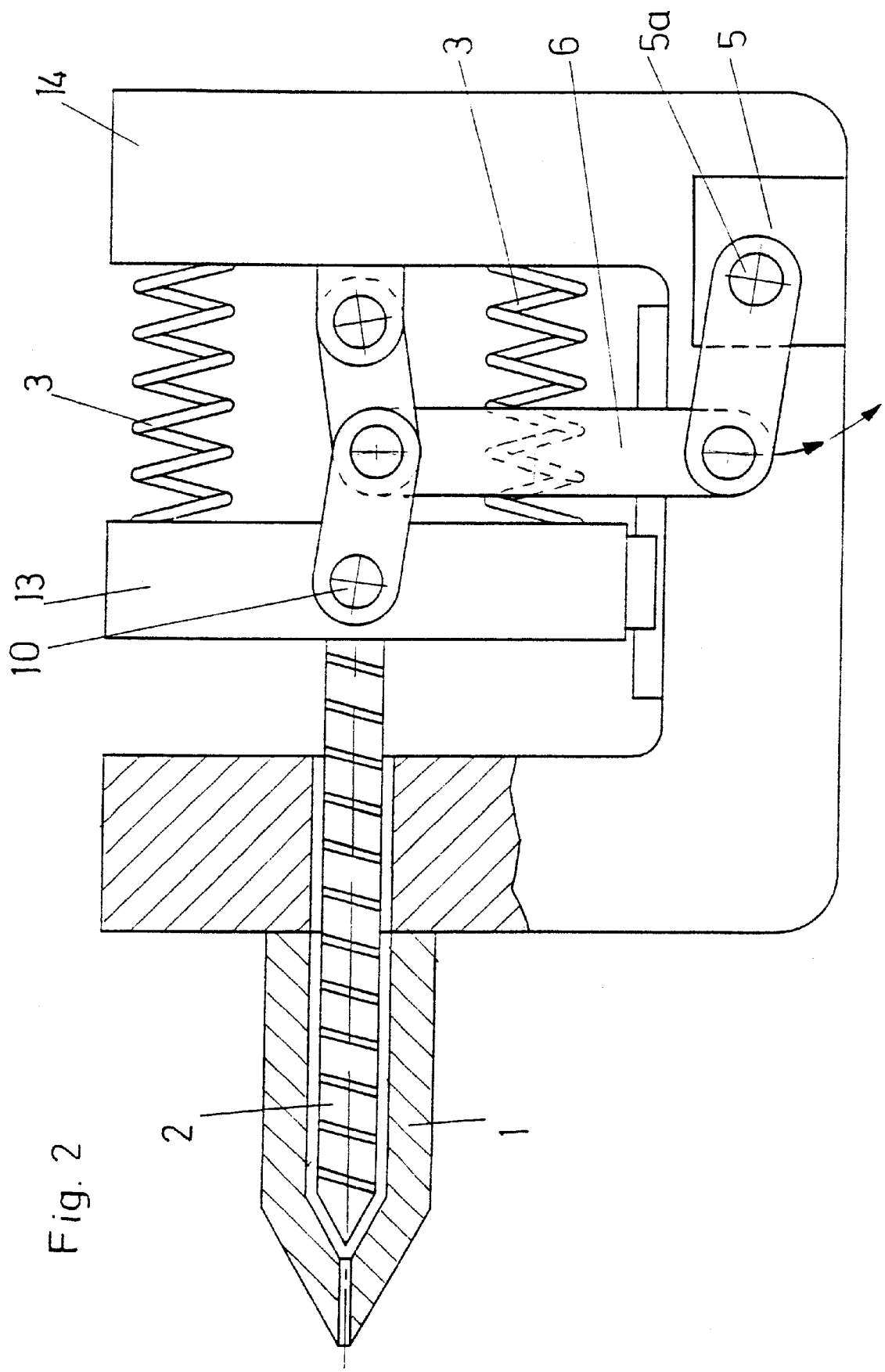
FIG. 2 shows a further embodiment of that injection arrangement.

FIG. 2 shows an alternative embodiment of the injection arrangement. In this case the plasticizing screw 2 which is mounted in the plasticizing cylinder 1 is connected to a movable guide plate 13. Axial displacement of the plasticizing screw 2 is again effected by a motor 5 whose output shaft 5a acts by way of the bell crank mechanism 6 on the movable guide plate 13 at the pivot 10. In this embodiment the springs 3 which serve as energy storage means are disposed between the movable guide plate 13 and the frame 14. In this case also energy is stored by compression in the springs 3 during the relatively low-power phase in the cycle of the motor 5, and that energy can be used as an assistance to cover the high level of power requirement in the injection operation.

Figure 3:
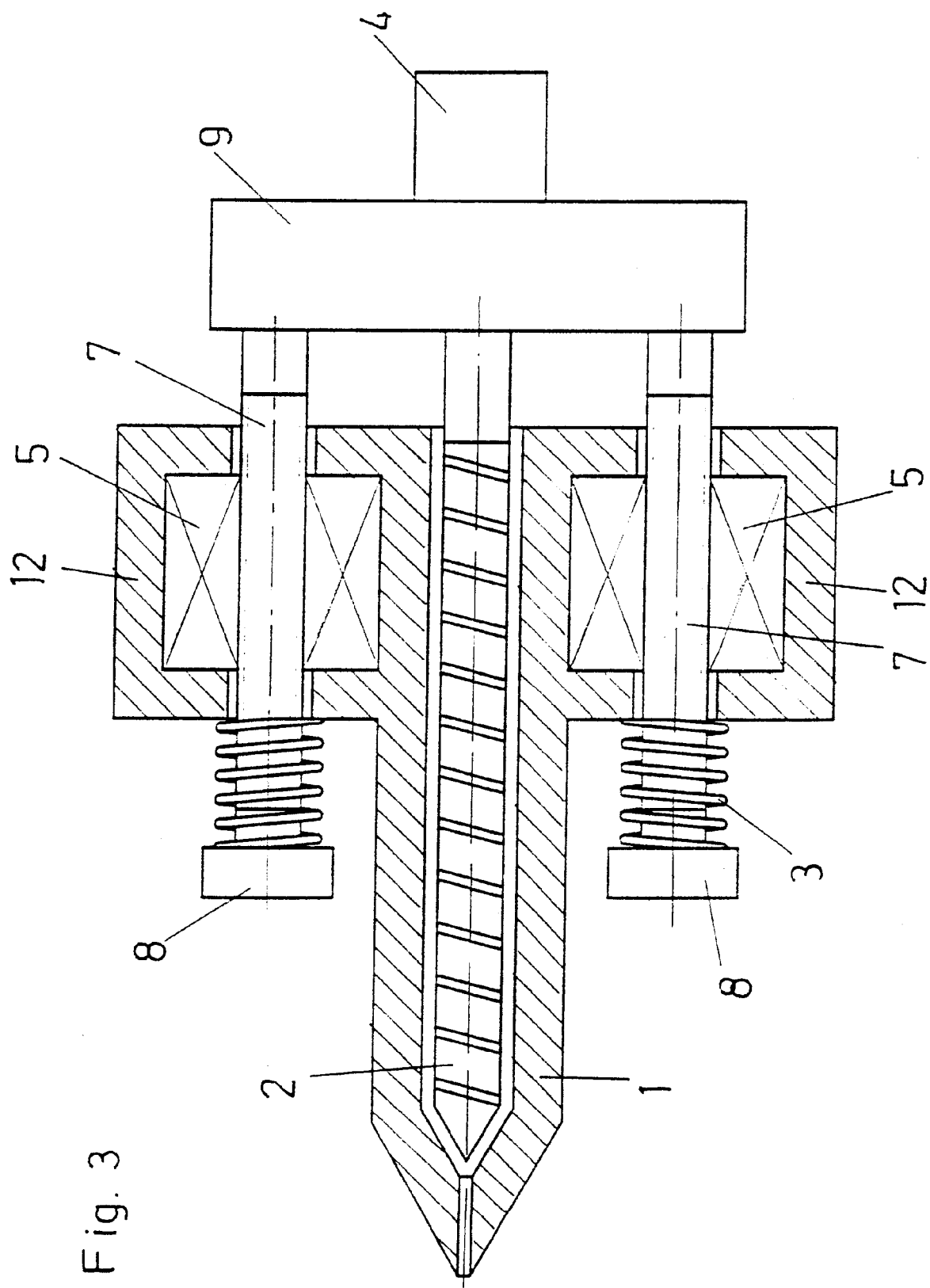
FIG. 3 shows a third structural variant of that arrangement.

The embodiment shown in FIG. 3 has many similarities to the embodiment shown in FIG. 1. The plasticizing screw 2 is again mounted rotatably and axially displaceably in the plasticizing cylinder 1 and is connected by way of the transverse bearer 9 to two symmetrically arranged rods 7. The rotational drive for the plasticizing screw 2 is provided by way of the motor 4 arranged on the transverse bearer 9. The spring storage means is formed by the springs 3 which can be compressed between the abutments 8 arranged at the outer ends of the rods 7 and the motor frame 12. The axial drive for the plasticizing screw 2 is provided by way of two motors 5 which are in the form of hollow-shaft motors and are enclosed by the respective motor frames 12.

Figure 4:
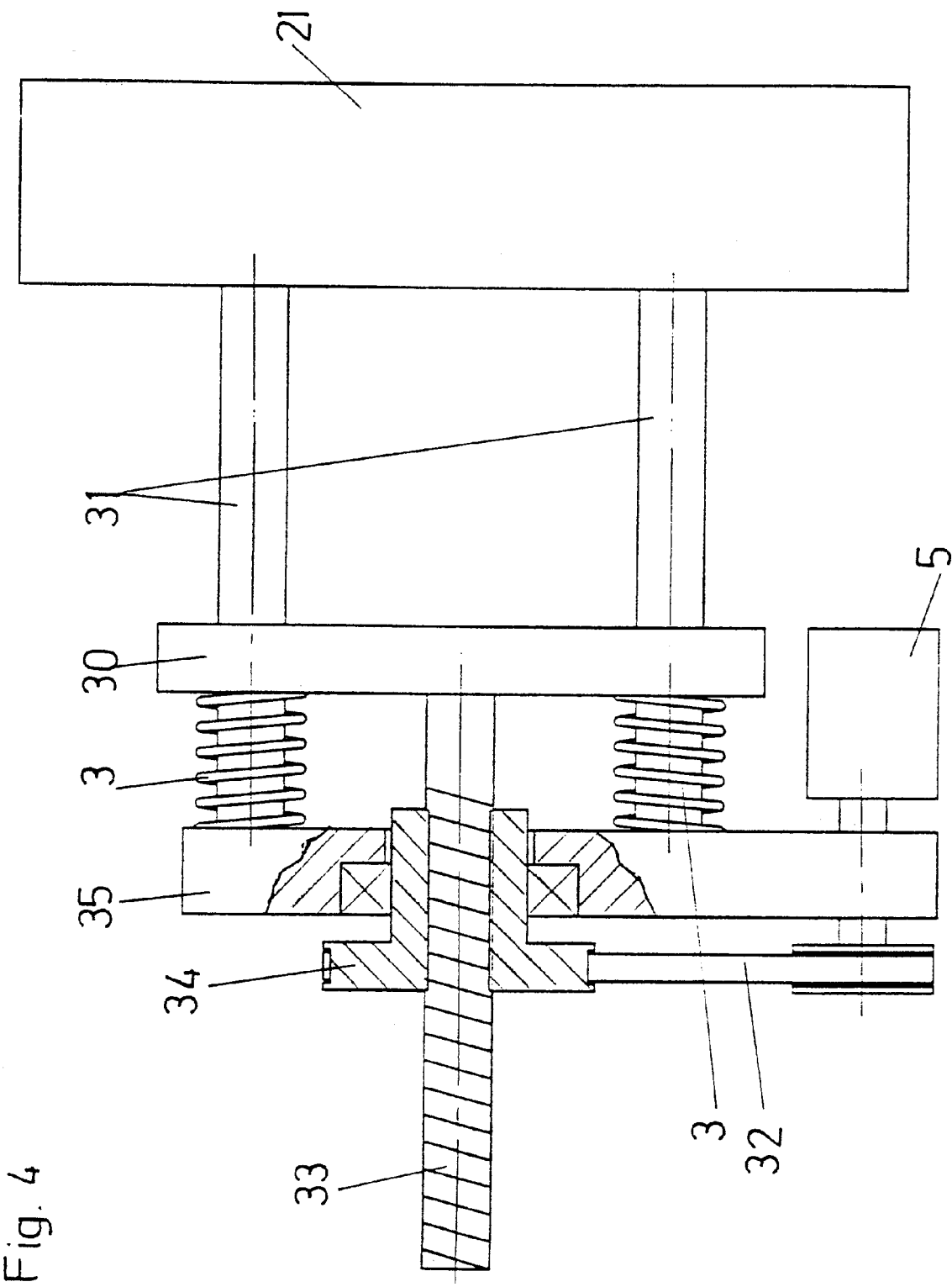
FIG. 4 is a diagrammatic view of the ejection arrangement of the injection molding machine according to the invention.

FIG. 4 shows the ejector arrangement of an injection molding machine according to the invention. In this case the movable mold mounting plate 21 is connected by way of two rods 31 to the carrier plate 35. The carrier plate 35 holds the spindle-nut drive for producing the axial movement of the ejector plate 30. The spindle-nut drive comprises the spindle 33 which is fixed to the ejector plate 30 and the nut 34 which is driven in rotation by the motor 5 by way of the belt drive 32. The spring storage means which is formed by the springs 3 is in this case arranged between the carrier plate 35 and the ejector plate 30.

The ejection cycle essentially consists of two different procedures. In the actual ejection operation the injection molding must be pushed out of the mold as quickly as possible between opening and subsequent closing of the two mold halves. Apart from the high speed required, that procedure is made more difficult by virtue of the fact that the injection molding sticks in the mold or that high frictional forces occur when the injection molding is of a configuration that is disadvantageous from the point of view of the injection molding procedure involved. In contrast substantially more time is available for retraction of the ejector and there are no particular resistances that have to be overcome in that operation.

As can be seen from FIG. 4 the two springs 3 are therefore stressed during the lower-power phase in the cycle, involving retraction of the ejector. The stored energy provides that the power requirement of the motor 5 can be markedly reduced at the beginning of the actual ejection operation when the injection molding has to be released from the mold and ejected therefrom. That permits the motor 5 to be of a smaller size, combined with a marked reduction in cost.

Figure 5:
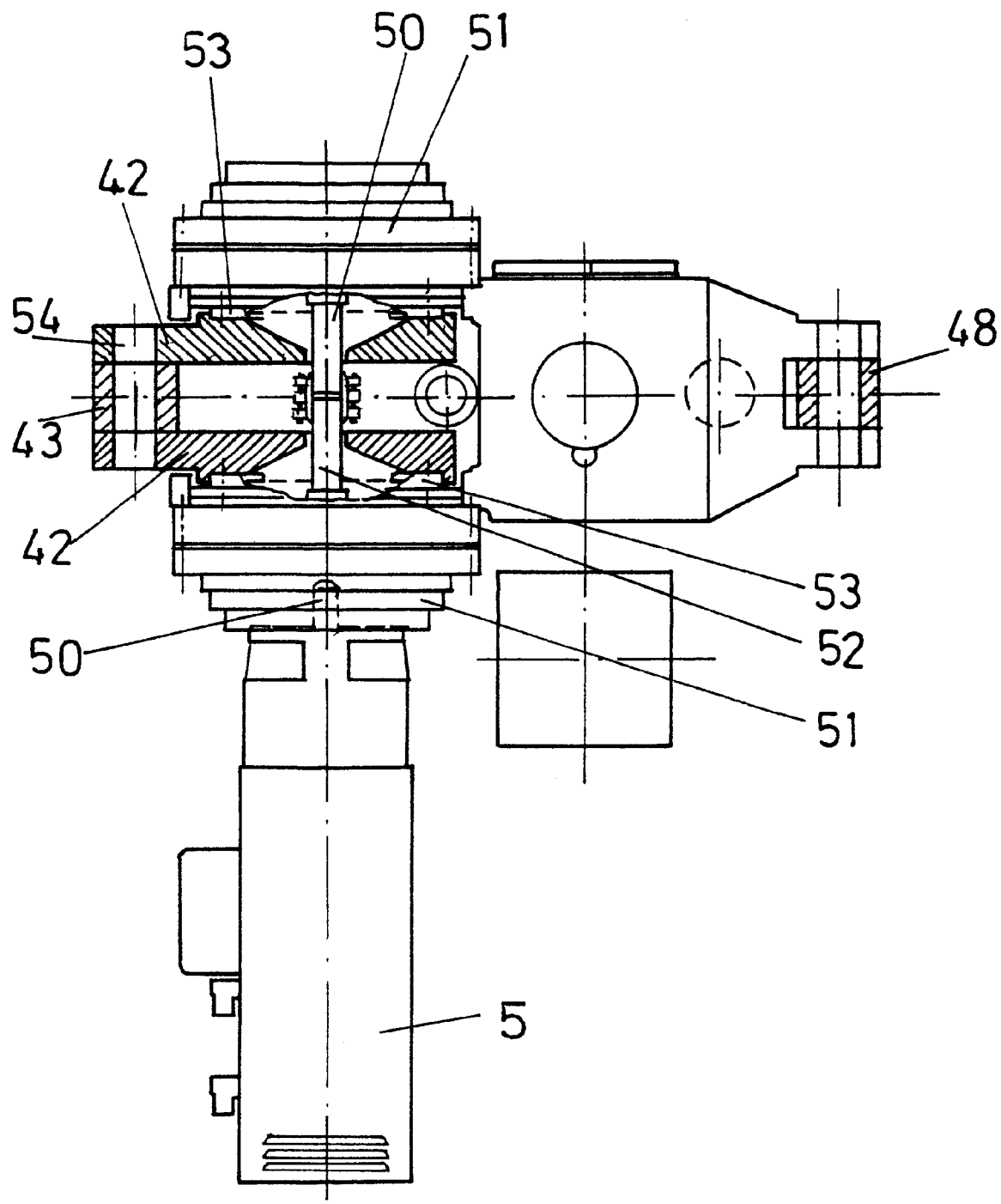
FIG. 5 is a view in vertical section through a further embodiment of an apparatus according to the invention.
Figure 6:
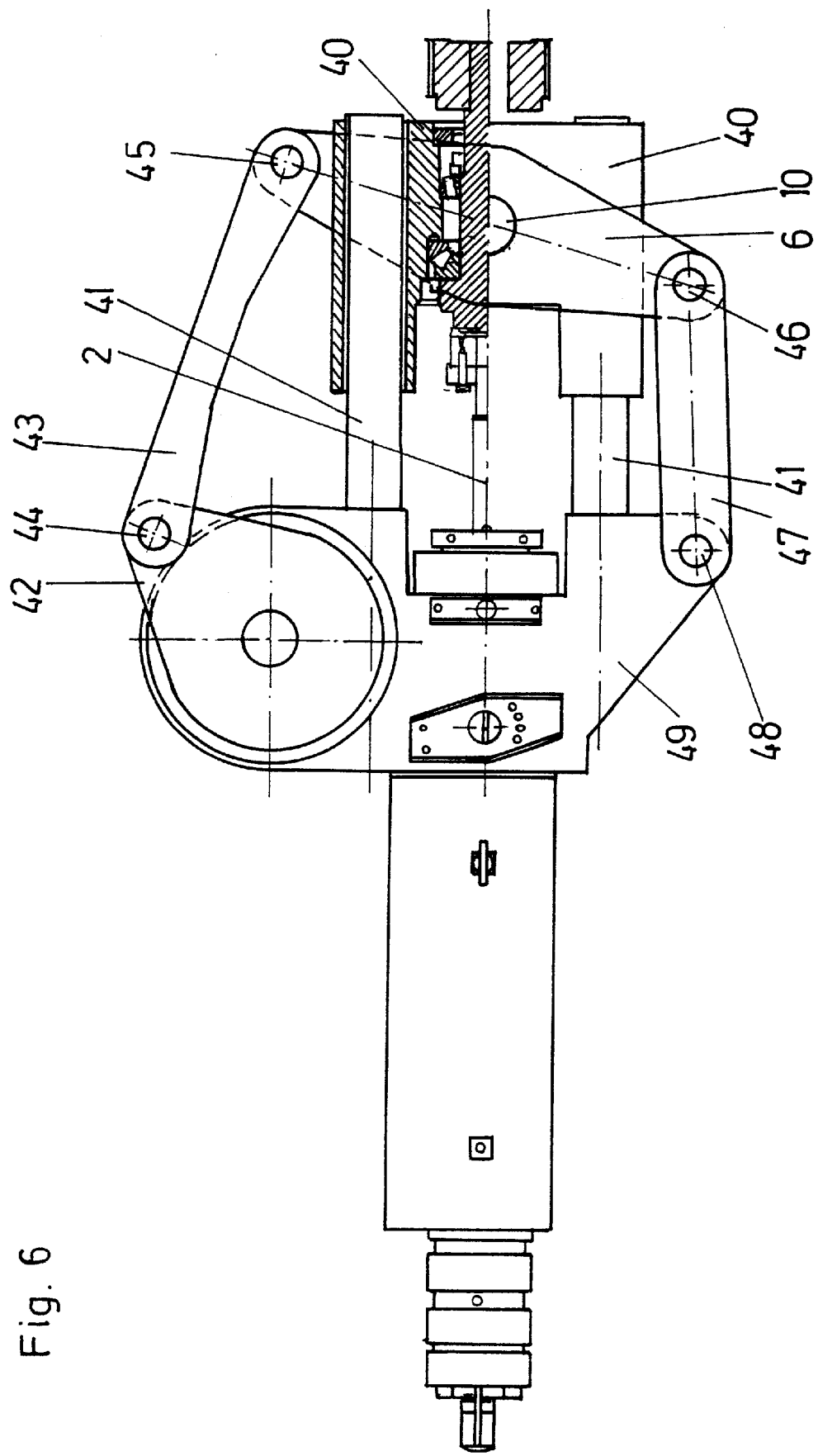
FIG. 6 is a plan view of the apparatus shown in FIG. 5.

The embodiment shown in FIGS. 5 and 6 does not have a spring, but the intermediate lever 6 according to the invention which engages a displaceably mounted component by way of a pivot 10. The displaceably mounted component 40 is displaceably mounted on bar members 41 and serves for axial displacement of the plasticizing screw 2 of an injection unit (not shown in greater detail) of an injection molding machine.

The intermediate lever 6 according to the invention is driven by way of a crank 42 and a bar 43, with the bar 43 being pivotably mounted at the locations 44 and 45.

The intermediate lever 6 is in the form of a two-armed lever which, as already mentioned, is connected at the center to the displaceably mounted component 40 by way of the pivot 10. On one side of the center the intermediate lever 6 is connected to the bar 43 while on the other side at the location 46 it is connected to an additional bar 47 which is pivotably mounted at a location 48 on a portion 49 which is fixed with respect to the injection molding machine. The additional bar 47 is disposed substantially parallel to the direction of movement of the displaceably mounted component 40 while the intermediate lever 6 is oriented substantially transversely with respect to that direction of movement.

High forces can be quickly applied by way of the crank drive and the intermediate lever 6, with force being transmitted to the movable component 40 in an advantageous manner.

The drive is afforded by way of an electric motor 5 which is preferably a servo motor, the electric motor driving the drive shaft 50 of two symmetrically arranged planetary transmissions 51, wherein the drive of the planetary transmission 51 which is the upper transmission in FIG. 5 is by way of a through-drive shaft 52 through the lower planetary transmission. The housings of the two planetary transmissions 51 are mounted fixedly with respect to the machine and the stepped-up output shafts are in the form of annular hollow shafts 53 to which the cranks 42 are fixedly connected. The bar 43 is mounted pivotably by way of a pin 54 to the free end of the crank 42.

The drive by way of two transmissions makes it possible to have a robust structure with symmetrical application of force to the crank. It is possible to achieve high step-up transmission ratios, which is additionally promoted by the bell crank action of such a crank-bar combination. Finally the intermediate lever 6 according to the invention also permits a further improvement in the transmission of force to the displaceably mounted component 40.

We claim:

1. Apparatus for driving a displaceably mounted component of an injection molding machine having at least one rotatably mounted crank which is driven by a motor, said crank driving the displaceably mounted component by way of a bar pivotably connected to the crank, the bar engaging a tiltably mounted intermediate lever which in turn is connected to the displaceably mounted component, the intermediate lever being mounted tiltably by way of an additional bar, said additional bar being pivotably mounted to be fixed with respect to the frame of the injection molding machine and being pivotably connected to the intermediate lever.

2. Apparatus as set forth in claim 1 wherein the additional bar is oriented substantially parallel or at an acute angle to the direction of movement of the displaceably mounted component.

3. Apparatus as set forth in claim 1 wherein the intermediate lever is in the form of a two-armed lever which at the center is pivotably connected to the displaceably mounted component, which is pivotably connected on one side of the center to the bar driven by the crank and which is tiltably mounted on the other side of the center.

4. Apparatus as set forth in claim 1 wherein the motor is an electric servo motor.

5. Apparatus as set forth in claim 1 wherein the motor drives the crank by way of at least one transmission.

6. Apparatus as set forth in claim 1 including two drives which are arranged in mirror-image symmetry and which are driven jointly by the motor and whose output shafts are connected to the crank which is arranged between the transmissions.

7. Apparatus as set forth in claim 1 wherein the displaceably mounted component is a component which is connected to the plasticizing screw of an injection arrangement, for the axial drive of said plasticizing screw.

* * * * *